O. H. HINDS.
SPRING WHEEL.
APPLICATION FILED OCT. 27, 1910.
1,002,692.  Patented Sept. 5, 1911.
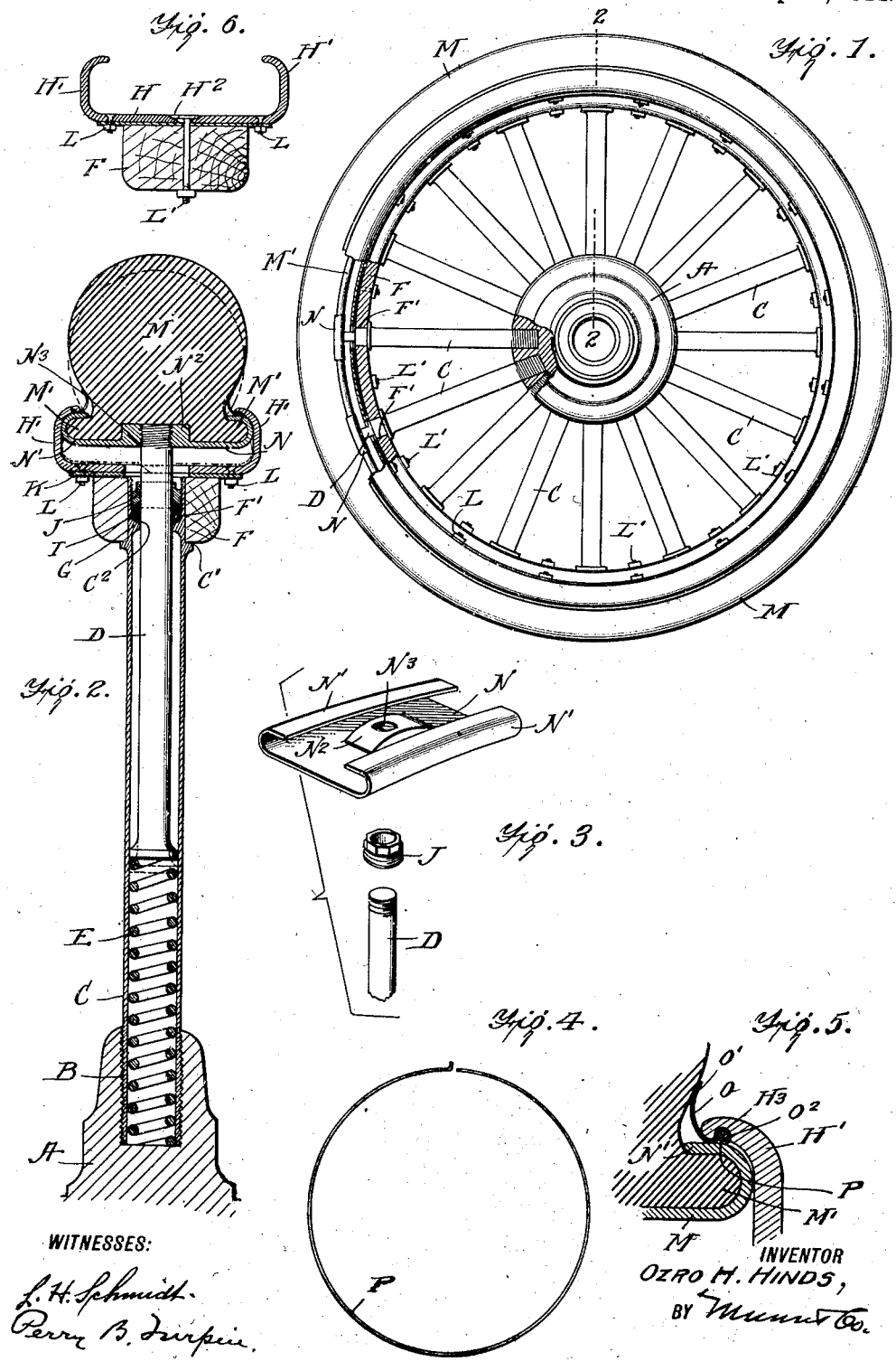
WITNESSES:
L. H. Schmidt
Perry B. Turpin
INVENTOR
OZRO H. HINDS,
BY Munn & Co.
ATTORNEYS

UNITED STATES PATENT OFFICE.

OZRO H. HINDS, OF LE MARS, IOWA.

SPRING-WHEEL.

1,002,692.  Specification of Letters Patent.  Patented Sept. 5, 1911.

Application filed October 27, 1910. Serial No. 589,324.

*To all whom it may concern:*

Be it known that I, OZRO H. HINDS, a citizen of the United States, and a resident of Le Mars, in the county of Plymouth and State of Iowa, have invented certain new and useful Improvements in Spring-Wheels, of which the following is a specification.

This invention is an improvement in spring wheels and has for an object to provide a novel construction of spring wheel in which the lateral rigidity incident to or characteristic of the ordinary automobile wheel will not be impaired and in which springs may be utilized to secure the desired resiliency of the wheel in a radial direction in a simple and efficient manner; and the invention consists in certain novel constructions and combinations of parts as will hereinafter be described and claimed.

In the drawing Figure 1 is a side view of a wheel embodying my invention, parts being removed and others shown in section. Fig. 2 is a section on about line 2—2 of Fig. 1, illustrating one of the spokes in connection with the hub, rim and tire of the wheel. Fig. 3 is a detail view illustrating certain of the parts in detail and detached. Fig. 4 is a side view illustrating the open spring ring for securing the dust excluding apron.
Fig. 5 is a detail section, enlarged, illustrating the connection of the apron, all of which will be more fully described hereinafter. Fig. 6 is a detail cross section of the felly and rim plates.

In carrying out the invention, the hub A is formed with radial sockets B in which are fitted and held preferably by threading, the inner ends of the tubular sections C of the spokes, the said spokes comprising the inner tubular section C and the rod section D which latter fits and operates at its inner end in the tube C and bears against a spring E disposed in said tube and bearing between the inner end of the rod D and the base wall of the socket B in which the tube C is secured, as will be understood from Figs. 1 and 2 of the drawing.

The felly F of the wheel is provided with openings F' into which the outer end of the tube C protrudes and within this opening F' is secured the stuffing box G of the tube C and through which the piston rod D operates, suitable packing being provided in the stuffing box as best shown in Fig. 2. The rod D passes through the stuffing box G and means are provided at the outer end of the rod for connecting the same with the tire, which latter is held in the rim plates H, as shown and more fully described hereinafter. By this construction I secure practically a rigid connection between the felly F and the hub so that the felly is firmly and rigidly supported in connection with the hub, the tire having a limited radial movement within the rim applied to the felly as best shown in Fig. 2 and as will now be described. This practically rigid connection between the felly and the hub renders the wheel practically rigid as against lateral strains and thus aids in securing a wheel which will have the desired rigidity in a lateral direction without impairing its radial resilience as is desired in this class of devices.

In producing the stuffing box G, the tube C is shouldered on its outer side at C' to abut the inner side of the rim F and the said tube is provided on its inner side at a point spaced from its outer end with an outwardly facing shoulder $C^2$ which may be slightly tapered as shown in Fig. 2, to form a bearing for the packing I and a gland J see Figs. 2 and 3, is screwed into the outer end of the tube C and compresses the packing I as will be understood from Fig. 2.

On the outer side of the felly F is secured a plate K which extends circumferentially around the felly and projects at its side edges laterally beyond the felly to receive the bolts L which aid in securing the rim plates H. These rim plates are provided at their outer ends with the flange H' which secure the tire M and lap slightly upon each other at their inner ends at $H^2$ as best shown in Fig. 6 of the drawing, the plates H being also secured at their meeting edges to the rim F by means of bolts L' coöperating with the bolts L as will be understood from Figs. 2 and 6 of the drawing.

The rim H is sufficiently large in a radial direction to permit the tire M to play between the full and dotted line positions shown in Fig. 2 and in connecting the outer end of the rod section D of the spoke with the tire M, it is preferred to employ abutment plates N having at their side edges flanges N' to clasp the circumferential flanges M' of the tire and having at their middle portions on their outer sides bosses or thickened portions $N^2$ in which are formed threaded openings $N^3$ to receive the outer threaded ends of the spoke rods D as will be understood from Figs. 2 and 3 of the drawing. This forms a firm connection between the rods D and the tire and aids in preventing any circumferential creeping of the tire as well as any lateral displacement thereof in the practical use of the invention.

As the tire moves from the full to the dotted line position shown in Fig. 2, a space will be opened between the flanges H' of the rim and the tire and to prevent the entrance of dust, dirt and the like at the sides of the tire I provide guards O in the form of aprons to extend between the flanges H' of the rim and the tire and to exclude foreign substances at this point. These guards O are in the form of aprons and may be of canvas, rubber or other suitable material or combinations of material and the guards are secured at their outer edges at O' to the tire M and extend thence within the rim and are secured at their inner edges at $O^2$ within the flanges H' of the rim. In thus securing the inner edges of the guard aprons, it is preferred to provide annular grooves $H^3$ in the inner sides of the flanges H' and to secure the apron-like guards O in the said grooves $O^2$ by means of spring wire rods P bent into ring form as shown in Fig. 4 and adapted to spring outwardly into the grooves $H^3$ and to secure the inner edges of the guards O in the said grooves as best shown in Fig. 4 of the drawing.

This construction effectually prevents the entrance of dust, dirt and the like and can be easily applied and removed, when desired.

In practice, the tire M may be of rubber, leather or other suitable material or combinations of materials suitable to produce a flexible tire. The apron may be secured at its outer edge or be integral at such point with the body of the tire.

In the operation of the invention graphite, oil or other lubricating material may be supplied to the tubes C to secure an easy, noiseless operation of the device. The rim being made in sections, one section may be slid laterally outward in removing and replacing the tire.

I claim:

1. The improvement in spring wheels herein described, comprising a hub, a felly, tubular spoke sections extending between the hub and felly and rigidly connecting the same, and having stuffing boxes within the felly, a plate extending around the felly and projecting laterally beyond the same, rim plates secured to the projecting portion of said plate and having tire securing flanges, a tire, and guard aprons extending between the tire and the rim flanges, springs securing said guard aprons within the flanges of the rim, abutment plates flanged at their side edges to engage with the tire and having bosses provided with threaded openings, piston rods threaded at their outer ends in said openings and operating at their inner ends in their respective tubes and springs in said tubes coöperating with the piston rods, substantially as set forth.

2. The combination of a tire having circumferential flanges, abutment plates having flanges to clasp the tire flanges and provided on their upper faces with projecting bosses embedded in the tire and provided with threaded openings, a rim receiving said tire and abutment plates, and spokes threaded at their outer ends in the threaded openings of the abutment plates, substantially as set forth.

3. A spring wheel comprising a hub, a felly, tubular spoke sections extending between the hub and felly and rigidly connecting the same and having stuffing boxes within the felly, a plate extending around the felly and projecting laterally beyond the same, rim plates secured to the projecting portions of the said plate and having tire securing flanges, a tire, abutment plates flanged at their side edges to engage with the tire and having bosses provided with threaded openings, piston rods threaded at their outer ends in said openings and operating at their inner ends in their respective tubes and springs in said tubes and coöperating with the piston rods, substantially as set forth.

OZRO H. HINDS.

Witnesses:
 SOLON C. KEMON,
 PERRY B. TURPIN.